United States Patent [19]
Adams

[11] Patent Number: 4,964,264
[45] Date of Patent: Oct. 23, 1990

[54] PROTECTIVE EAR BAGS FOR DOGS

[76] Inventor: Depy P. Adams, 2019 Ferncliff Rd., Charlotte, N.C. 28211

[21] Appl. No.: 467,924

[22] Filed: Jan. 22, 1990

[51] Int. Cl.⁵ .............................................. B68B 5/00
[52] U.S. Cl. ......................................... 54/80; 119/96
[58] Field of Search ............... 54/80; 383/37; 119/96; 2/158, 209

[56] References Cited

U.S. PATENT DOCUMENTS

| | | | |
|---|---|---|---|
| 1,010,248 | 11/1911 | French | 2/209 |
| 2,136,115 | 11/1938 | McCaleb | 54/80 |
| 4,134,153 | 1/1979 | Voorhees | 2/209 X |

FOREIGN PATENT DOCUMENTS

| | | | |
|---|---|---|---|
| 111781 | 12/1917 | United Kingdom | 2/209 |

*Primary Examiner*—Robert P. Swiatek
*Attorney, Agent, or Firm*—W. Thad Adams, III

[57] ABSTRACT

An ear covering for protecting the ears of long-eared dogs during eating, comprising first and second ear-sized bags having first and second sides closed on three side edges and open on a fourth side edge. An elongate connector having first and second opposed ends used to connect the bags together. The first end is attached to one of the first and second sides adjacent the open side edge and the second end is attached to the other of the first and second sides adjacent the open side edge. The elongate connector is adapted for extending across and suspending the first and second bags from the top of the dog's head, with the dog's ears releasably positioned in the first and second bags and removable by the dog shaking its head.

5 Claims, 3 Drawing Sheets

PROTECTIVE EAR BAGS FOR DOGS

TECHNICAL FIELD AND BACKGROUND OF THE INVENTION

This invention relates to protective ear coverings, or "ear bags" for dogs, particularly long-eared, long-haired dogs such as cocker spaniels and setters. This type of dog very commonly soils its ears as it eats because the length of the ear causes the ears to fall into the food. Soiled ears are unsightly and quickly develop an unpleasant odor unless frequently washed.

The solution described in this application was developed with the assistance of a white and brown Cocker Spaniel named Annie, whose dislike for dirty ears provided the essential motivation for the conception and reduction to practice of the invention. Extensive testing has determined that a dog can very easily adapt to wearing the ear bags during eating and removing the coverings after eating merely by shaking the head vigorously.

SUMMARY OF THE INVENTION

Therefore, it is an object of the invention to provide a protective covering for long-eared dogs.

It is another object of the invention to provide a protective covering for long-eared dogs which is very inexpensive and disposable.

It is another object of the invention to provide a protective covering for long-eared dogs which can be made as needed from easily available and inexpensive materials.

It is another object of the invention to provide a protective covering for long-eared dogs which can be placed on the dog's ears without straps or fasteners and removed by the dog itself when it is finished eating.

These and other objects of the present invention are achieved in the preferred embodiment disclosed below by providing an ear covering for protecting the ears of long-eared dogs during eating, comprising first and second ear-sized bags having first and second sides closed on three side edges and open on a fourth side edge. Elongate connector means having first and second opposed ends are used to connect the bags together. The first end is attached to one of the first and second sides adjacent the open side edge and the second end is attached to the other of the first and second sides adjacent the open side edge.

The elongate connector means is adapted for extending across and suspending the first and second bags from the top of the dog's head, with the dog's ears releasably positioned in the first and second bags and removable by the dog shaking its head.

According to one preferred embodiment of the invention, the first and second bags comprise transparent plastic sandwich bags.

According to another preferred embodiment of the invention, the connector means comprises a piece of wire.

According to yet another preferred embodiment of the invention, the connector means comprises a plastic-covered wire twist-tie.

Preferably, the first and second bags comprise transparent plastic sandwich bags having a plastic zipper comprising a pair of spaced-apart plastic ribs defining a groove therebetween and formed on one side of the bag adjacent the open side edge thereof. A single rib is integrally-formed on the other side of the bag for being press-fitted into the groove. The pair of ribs or the single rib forms a tear-resistant support around which the elongate connector means is attached.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
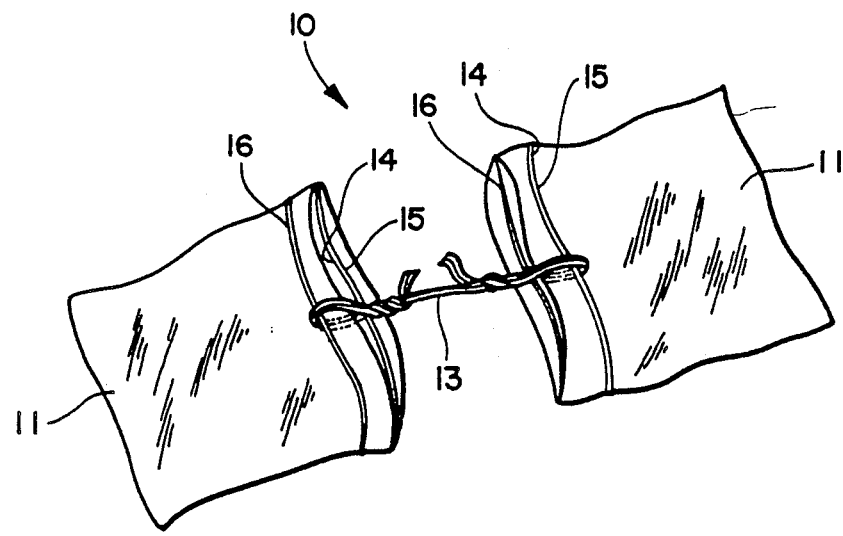
FIG. 1 is a perspective view of a set of ear bags according to an embodiment of the invention.

Referring now specifically to the drawings, a set of ear bags according to the present invention is illustrated in FIG. 1 and shown generally at reference numeral 10. The set of ear bags 10 is formed from a pair of "Zip-Loc" transparent plastic sandwich bags 11. Boxes of these sandwich bags are available in any grocery store and are quite inexpensive. These particular bags are characterized by a integrally-formed plastic zipper which permits the contents of the bag 11 to be sealed to preserve freshness and to prevent contamination of the contents. The zipper is formed by a pair of spaced-apart ribs 14, 15 on one side of the bag which defines a groove, and a single rib 16 on the other side which is pressed into the groove to form the seal.

The ear bag set 10 is constructed by using a knife or other sharp object to pierce one side of each bag 11 and form a small hole next to the ribs 14, 15 or the rib 16 equidistant the two opposing side edges. Since the ribs 14, 15 are together heavier than the rib 16, ribs 14, 15 are preferred as the tear resisting means. A connector 13, such as a conventional twist-tie of the type used to close bread bags, is extended through the hole in one of the bags 11, and then doubled over itself and twisted together. The other end of the twist-tie is extended through the hole in the other bag 11 and likewise doubled over itself and twisted together. Ribs 14 and 15, or the single rib 16 prevent the twist-tie from tearing through the plastic. The resulting set of ear bags is shown in FIG. 1.

Figure 2:
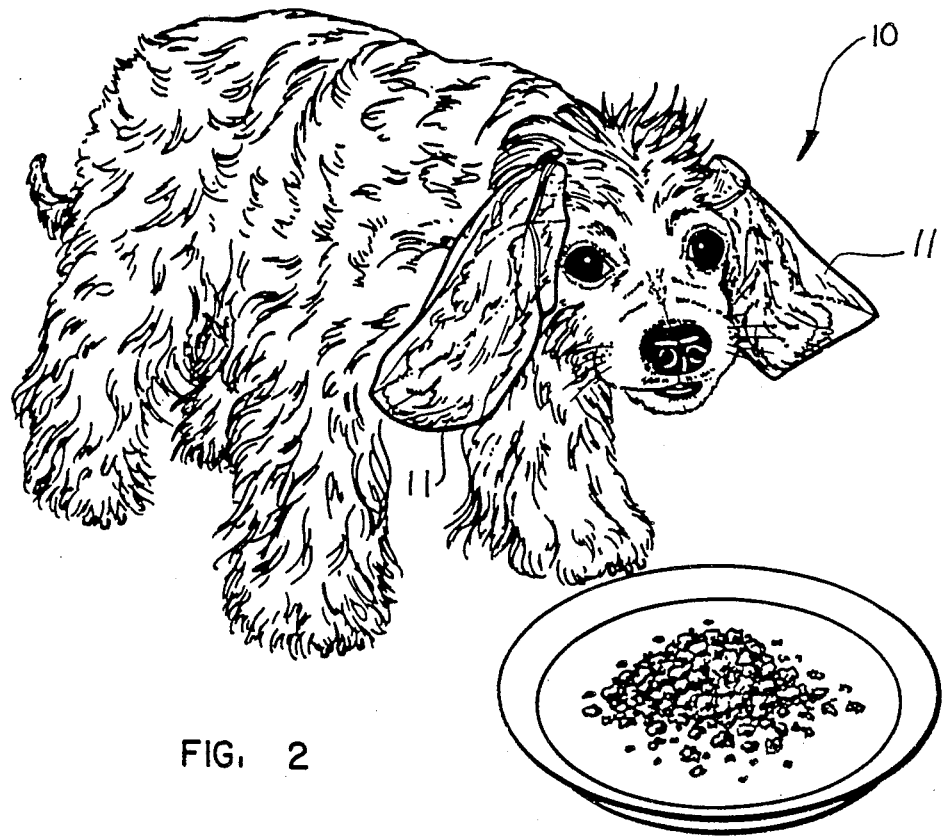
FIG. 2 is a view of the ear bags in place on a dog.
Figure 3:
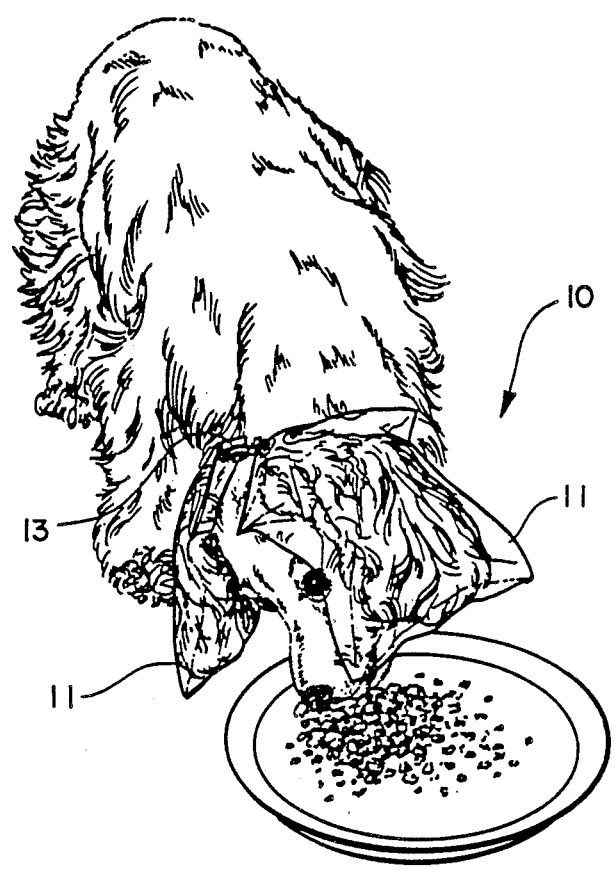
FIG. 3 shows the ear bags in place while the dog eats.

As is shown in FIG. 2, the ear bag set is placed on the dog by first putting one ear on one of the bags 11, extending the connector 13 across the top of the head of the dog and then suspending the other ear in the other bag 11. Note that the ear bags 11 are not tied to or in any other way attached to the dog. They are merely suspended from the top of the dog's head, with the weight of the ears themselves holding the ear bag 11 in place.

Figure 4:
FIG. 4 shows the dog shaking off the ear bags.

The ear bags are held in place even when the dog's head is lowered for eating, as is shown in FIG. 4.

When the dog has finished eating, the ear bag set 10 may be removed for the dog, or the dog can be easily trained to shake off the ear bag set 10 as is shown in FIG. 5.

The ear bag set 10 is extremely inexpensive to make and can therefore be disposed of when soiled.

I claim:

1. An ear covering for protecting the ears of longeared dogs during eating, comprising:
    (a) first and second ear-sized bags having first and second sides closed on three side edges and open on a fourth side edge; and (b) elongate connector means having first and second opposed ends, said first end for being attached to one of said first and second sides adjacent said open side edge and said second end for being attached to the other of said first and second sides adjacent said open side edge;

said elongate connector means adapted for extending across and suspending said first and second bags from the top of the dog's head, with the dog's ears releasably positioned in said first and second bags and removable by the dog shaking its head, and said ear covering being free of holding means for extending under or around the head or neck of the dog whereby the ear covering is held on the dog only by the connector means extending across the top of the dog's head and the weight of the dog's ears in the first and second bags.

2. An ear covering according to claim 1, wherein said first and second bags comprise transparent plastic sandwich bags.

3. An ear covering according to claim 1, wherein said connector means comprises a piece of wire.

4. An ear covering according to claim 1, wherein said connector means comprises a plastic-covered wire twist-tie.

5. An ear covering for protecting the ears of long-eared dogs during eating, comprising:
   (a) first and second ear-sized bags having first and second sides closed on three side edges and open on a fourth side edge; and
   (b) elongate connector means having first and second opposed ends, said first end for being attached to one of said first and second sides adjacent said open side edge and said second end for being attached to the other of said first and second sides adjacent said open side edge;

said elongate connector means adapted for extending across and suspending said first and second bags from the top of the dog's head, with the dog's ears releasably positioned in said first and second bags and removable by the dog shaking its head, wherein said first and second bags comprise transparent plastic sandwich bags having a plastic zipper comprising a pair of spaced-apart plastic ribs defining a groove therebetween and formed on one side of said bag adjacent the open side edge thereof, and a single rib integrally-formed on the other side of said bag for being press-fitted into said groove, said pair of ribs or said single rib forming a tear-resistant support around which said elongate connector means is attached.

* * * * *